March 18, 1941.                    E. J. SCHAEFER                    2,235,537
PHASE RELAY CONTROL FOR SPLIT PHASE MOTORS
Filed Sept. 13, 1939

STANDSTILL

CUT OUT SPEED

Inventor:
Edward J. Schaefer,
by Harry E. Dunham
His Attorney.

Patented Mar. 18, 1941

2,235,537

UNITED STATES PATENT OFFICE 2,235,537

PHASE RELAY CONTROL FOR SPLIT PHASE MOTORS

Edward J. Schaefer, Fort Wayne, Ind., assignor to General Electric Company, a corporation of New York Application September 13, 1939, Serial No. 294,645

9 Claims. (Cl. 172—279)

My invention relates to a control system for alternating current motors and in particular to a system for controlling the starting operation of split phase motors by utilizing the change in phase relation which takes place in the currents in the different windings of the motor during the starting operation. The currents in the main and starting windings of a split phase motor have one phase relation when they are first energized and the motor is at standstill and quite a different phase relation when the motor comes up to speed. A suitable relay, responsive to this change in phase relation, may be used to good advantage to cut out or otherwise modify the starting winding circuit between starting and running conditions.

Figure 1:
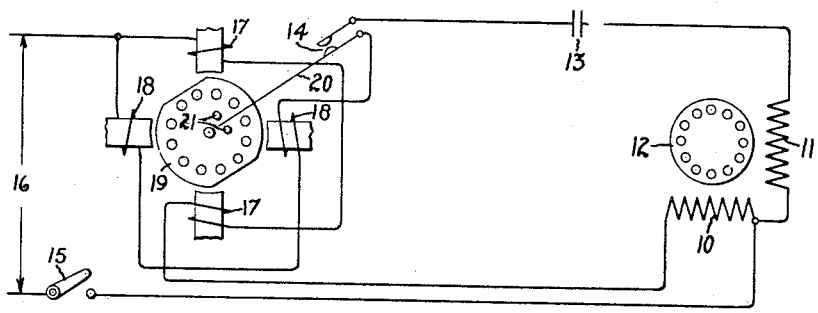
Figure 2:
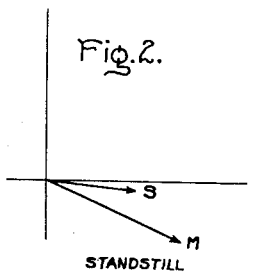
Figure 3:
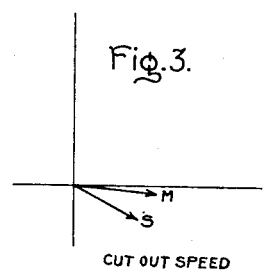
Figure 4:
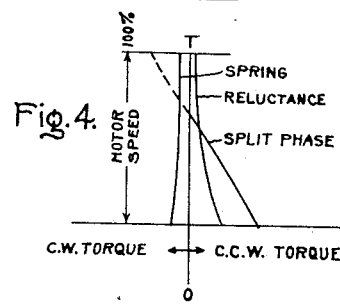
Figure 5:
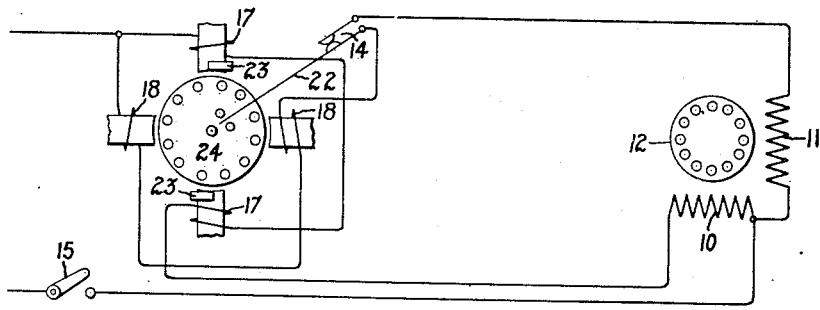
Figure 7:
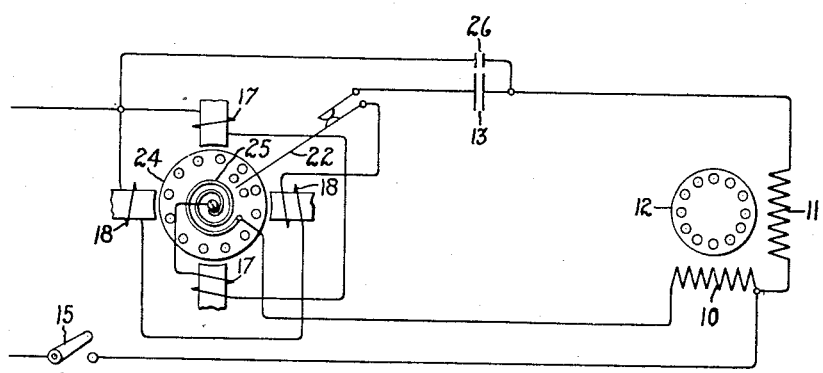
Figure 6:
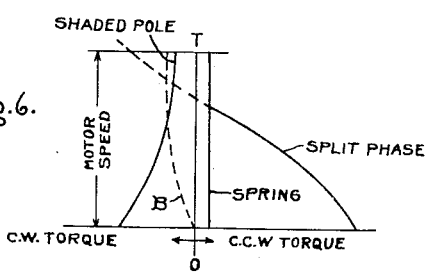

The features of my invention which are believed to be novel and patentable will be pointed out in the claims appended hereto. For a better understanding of my invention, reference is made in the following description to the accompanying drawing in which Fig. 1 represents the application of my invention to a split phase motor for opening the starting winding circuit between starting and running conditions. Figs. 2 and 3 show vectors representative of the change in phase relationship of the currents in the main and starting winding of a split phase motor at start and at starting winding cut-out speed, respectively. Fig. 4 shows, by means of curves, torque variations in my phase responsive relay when used to control a split phase motor. Fig. 5 shows a modified form of relay using shading coils and also with the spring force reversed, as compared to the relay of Fig. 1. Fig. 6 shows the torque relations of the relay of Fig. 5, and Fig. 7 shows another form of phase relay using a bimetallic thermal responsive torque device as applied for reducing the capacity in the starting winding circuit of a capacitor run motor.

In Fig. 2, S and M represent the approximate vector relation of the currents in the starting and main windings respectively of a split phase motor when these windings are first energized and the motor is at standstill. Fig. 3 represents the approximate vector relation of these currents when the motor has come up to the speed at which the starting winding is ordinarily cut out of circuit. It is seen that during such change in speed the current vectors S and M cross each other, and that whereas in Fig. 2 the starting winding current vector may be considered to lead the main winding current vector, in Fig. 3 the reverse is true. The vector relation depicted in Fig. 2 therefore gives a phase rotation in one direction for main and starting windings displaced at a fixed angle to each other, whereas the phase rotation is reversed in Fig. 3. The phase relationship at start determines the direction in which the motor will run. As is well known, such a motor does not reverse its direction of rotation as it comes up to speed, even though the starting winding be left connected, although it might appear that it should do so.

However, when the rotor of such a motor is rotating at appreciable speed, additional single phase torques in the direction of rotation come into action and overcome the effect of the reversed split phase torque. These changing vector relations of Figs. 2 and 3 also serve to explain why it is desirable to cut out the starting winding. of such a motor when it comes up to speed. Also, it may be stated that if the vector relations pictured in Fig. 3 could have existed while the motor was at standstill, the motor would have started in the reverse direction.

This reversal of the main and starting current vector relation occurs in all split phase motors between starting and running conditions, regardless of whether the motor be of the resistance, reactance, or condenser phase split type, so long as the phase modifying impedance used to obtain the starting phase split remains unchanged. It is, however, practicable to have the starting winding in circuit for running, if the phase modifying impedance in its circuits is very materially changed between starting and running conditions. An example of this is the capacitor-start, capacitor-run type of motor shown in Fig. 7 where the greater part of the starting capacity is cut out when the motor comes up to speed, and the reversed phase relation of the main and start current vectors which would otherwise exist during running is prevented or is restored to its original direction by the proper change in the capacitance used.

In accordance with my invention, I make use of this change in phase relationship of the currents in the two windings of the motor to operate a phase responsive relay to cut out or modify the starting winding circuit of the motor as desired. One form of such a relay as applied to cut out the starting winding of a condenser split phase motor is illustrated in Fig. 1. Here 10, 11 and 12 represent the main, start, and secondary windings of the split phase motor to be controlled. 13 represents a starting capacitor and 14 a switch in the starting winding circuit. 15 represents the line switch for the motor and 16 the supply terminals.

The relay is essentially a small split phase motor having what corresponds to main windings 17 and to start windings 18, angularly displaced and respectively connected in series with the main and start windings of the motor to be controlled. The stator windings of the relay will be of low resistance and of few turns but their ampere turn relationship, as thus connected in series with the motor to be controlled, will be generally the same as in an ordinary split phase motor. The rotor 19 of the relay may be of the squirrel cage type, as represented.

The movable member of the starting winding cut-out switch 14 is mounted on an arm 20 fixed at one end and with its other end extending freely between abutment pins 21 on the rotor of the relay. The operating connection arm 20 is resilient and is biased to hold the switch contacts 14 open when the relay is deenergized and has no torque. This is the condition represented in the drawing. When the relay has sufficient counter-clockwise torque it will close the switch 14. However, arm 20 is made stiff enough in comparison with the torques of the relay to prevent more than a partial rotation of the relay rotor. Thus the arm 20 in conjunction with pins 21 on the rotor act as stops for the relay rotor and prevent more than a fraction of a revolution of the rotor in either direction from the position shown.

It is seen that with the arrangement of Fig. 1 the starting winding cut-out switch 14 is normally open. Hence, when line switch 15 is initially closed to start the main motor, the series starting winding circuit of both split phase motor devices is open and these devices will thus have no split phase starting torque. In order to give the relay a counter-clockwise torque under this condition, sufficient to overcome the bias of resilient arm 20, to thus initially close switch 14, I provide its rotor iron with polar salients as represented in the outline end view thereof. The relay rotor 19 is so positioned with respect to the main field 17 which is now energized, that the relay has a counter-clockwise reluctance torque that causes the closing of switch 14. Thus switch 14 closes almost instantaneously after the closure of line switch 15 and motor 12 starts. The split phase induction motor torque of the relay is now present also and it is in a counter-clockwise direction at first and thus adds to the reluctance torque to keep switch 14 firmly closed. Motor 12 comes part way up to speed and the phase relation of the currents in its windings changes as explained in connection with Figs. 2 and 3. This also correspondingly changes the phase of the currents in the windings 17 and 18 of the relay since these windings are connected in series with those of the motor, whereas the phase relationship is determined almost entirely by the motor alone, since the relay has a negligible influence on the phase relationship or value of the current.

Owing to the reversal of the phase rotation of the current in the displaced windings 17 and 18 of the relay, its split phase torque reverses and becomes clockwise. This reversal of split phase induction motor torque is effective in the relay and not in the motor because the relay is under a standstill condition, whereas the motor has partially come up to speed and has developed single phase torques producing rotation in the same direction as that in which the motor is running.

In the meantime the counter-clockwise reluctance torque of the relay has decreased because the current through winding 17 has dropped appreciably from the value which flowed through the motor at the instant of starting. Hence, the switch 14 opens the starting winding circuit including windings 11 and 18. The clockwise split phase torque of the relay thus becomes zero and the counter-clockwise reluctance torque is no longer sufficient to close the switch against the tension of spring arm 20. Hence switch 14 remains open and will not close again until the motor is shut down and restarted, or until a main winding current starting condition exists otherwise. For example, a heavy overload sufficient to nearly stall the motor would increase the reluctance torque of the relay and close the starting winding switch.

The relay torque relations can readily be so proportioned that the relay will function to open the starting winding circuit of the motor at the desired cut-out speed. These relay torque relations may be represented in the curves of Fig. 4.

In Fig. 4, let the ordinates represent variations in the motor speed from standstill to 100%, reading upward. Let the abscissa represent torque values in the phase responsive relay with zero torque falling on the line marked OT and with clockwise torque plotted to the left and counter-clockwise torque to the right of line OT. The three curves marked "spring," "reluctance" and "split phase" represent the relay torques developed by the spring 20, the reluctance motor action of the relay, and the split phase induction motor action of the relay respectively. When switch 14 is closed the spring torque is a clockwise torque and is fairly constant. The reluctance torque is a counter-clockwise torque and decreases with rise in speed of the motor and the corresponding reduction of the current in windings 17 of the relay. The split phase induction motor torque is first counterclockwise and becomes zero where this curve crosses line OT, and it then reverses and becomes a clockwise torque. The upper part of the split phase induction motor torque curve is shown dotted to indicate that it disappears when the relay operates to open switch 14.

It is evident from Fig. 4 that the resultant torque of the relay is counter-clockwise at low speeds and hence will hold the switch closed. However, at about the speed where the induction torque becomes zero or slightly below, the resultant torque becomes zero, and at higher speeds the resultant torque becomes clockwise. This is true even though the induction torque disappears due to opening of the starting winding circuit. Hence, the opening of switch 14 is certain and the exact speed where this will occur can be easily changed by changing either the spring or reluctance torques or both, spacing of the contacts, etc. The reluctance torque may be increased by making the salient pole effect of the rotor 19 more prominent.

Over the small range of rotation of the relay armature the relay has little if any reluctance torque due to the starting field winding 18 when it is energized because the salient pole shape of the armature and its position is such that its salient pole portions always completely cover the faces of the poles of windings 18. That is, the counterclockwise rotation of the relay armature from the position shown is never sufficient for clockwise reluctance torque, due to field 18, to develop to any appreciable extent. Hence the relay as used may be considered to have negligible clockwise reluctance torque under all conditions.

In Fig. 5 I have shown a modified form of phase relay. In this example the starting switch 14 is biased to a closed position by the spring tension of contact arm 22 and hence the reluctance torque of the relay of Fig. 1 is not required for initially closing switch 14 when the motor is first energized by the closing of line switch 15. The salient pole reluctance torque feature of Fig. 1 is hence not used in the rotor 24 of Fig. 5. When the switch 15 of Fig. 5 is closed to start the motor, we have counter-clockwise split phase relay torque as in Fig. 1 which decreases and becomes zero and reverses as the motor comes up to speed, as in the curve marked "split phase" in Fig. 6, but as indicated in the dotted line part of such curve, this torque disappears when the starting windings of the motor and relay are cut out. Hence in Fig. 5 where the switch 14 is spring biased to a closed position, it is necessary to provide a clockwise torque that will move this switch to open position when the split phase induction torque is eliminated. This is obtained by means of the shading coils 23 on the poles of the main winding 17, positioned to produce a clockwise shaded pole induction torque in the relay. This shaded pole torque is of course present whenever the winding 17 carries current and hence is present at starting as well as after the starting winding has been opened. As shown in the curve marked "shaded pole" in Fig. 6, however, at starting the split phase counter-clockwise torque is made to predominate and hence the clockwise shaded pole torque does not become effective until the counter-clockwise split phase torque has decreased nearly to zero. When this occurs the shaded pole torque overcomes the spring torque of arm 22 and opens the starting winding circuit. The torque relations are made such that this occurs at the desired speed.

In most shaded pole motors the shaded pole torque decreases as the speed increases, but it must be remembered that the relay rotor does not rotate and hence the shaded pole torque decreases only as the main winding current decreases and has a substantial value at the cut-out speed and above, as indicated in Fig. 6.

In the form of the invention shown in Fig. 7 the relay is similar to that of Fig. 5 with the exception that a bimetallic thermal responsive torque producing spiral 25 serves to perform the function of the shading coils 23 of Fig. 5. The spiral 25 is connected in series with the main winding circuit and hence is responsive to the main winding current and as the spiral becomes heated, produces a clockwise torque on the relay armature. Its thermal time characteristics are so designed with respect to the normal starting current in the main winding of the motor that its clockwise torque builds up to the value necessary to open the starting switch 22 at the proper time and speed, under normal conditions. The clockwise torque speed curve of the thermal device will normally be about as represented in the dotted line curve B of Fig. 6.

Fig. 7 also shows a capacitor start—capacitor run motor system in which 13 represents the large starting condenser and 26 the small running condenser. Most of the starting current flows through condenser 13 and relay winding 18 and hence this may be considered the starting winding circuit and the starting current therein contributes to the split phase torque of the relay as in the other modifications. The running current through condenser 26 and winding 11 of the motor need not flow through the relay and is preferably by-passed around the relay. Hence this running current does not interfere with the complete elimination of split phase relay torque after the condenser 13 is cut out. With the use of a running condenser and with the running condenser current flowing through the relay the split phase torque curve above the cut-out speed would be different from that represented in the dotted line portion of the "split phase" curve of Fig. 6. In such a case the split phase relay torque above the cut-out speed would drop to a small value and might even be counter-clockwise because of the elimination of most of the capacity and the resulting different phase conditions at running speeds. Hence, it is not fatal to the operation of the relay to permit the running current of winding 11 and condenser 26 to flow through the relay but also, as shown, it is unnecessary.

In accordance with the provisions of the patent statutes, I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. A split phase motor having main and starting windings, a two-position switch for modifying the starting winding connections, means for biasing said switch towards one of its positions, and a relay responsive to the change in the phase relation of the currents in the main and starting windings of the motor between starting and running conditions for controlling said switch.

2. A split phase motor having main and starting windings, two-position switching means for modifying the starting winding connections, resilient means for biasing said switching means to one of its positions, and a relay having a pair of windings respectively connected in series relation with the main and start windings of the motor and responsive to the change in phase relation of the currents in the main and start windings of the motor between starting and running conditions for controlling said switch.

3. A split phase motor having main and starting winding circuits, a switch having open and closed positions for modifying the starting winding circuit connections between starting and running conditions, a relay device for operating said switch, said relay including a split phase induction motor having a pair of angularly displaced primary windings and a secondary rotor, one of said relay primary windings being permanently connected in series in the main winding circuit of the motor and the other relay primary winding being connected in the starting winding circuit of the motor, said relay producing a split phase torque in a switch closing direction when both of its primary windings are energized and the motor is at standstill, which torque diminishes as the motor comes up to speed, due to the change in the phase relation of the currents in the main and starting winding circuits, a resilient operating connection between said relay rotor and switch which serves to prevent more than a fraction of a revolution of such rotor and to produce a bias on said switch which holds it in one position when the relay is not energized, and means on said relay and responsive to the current in the main winding circuit for producing a torque opposed to the bias of said resilient operating connection, said relay serving to maintain said switch closed during the starting of the motor until a predetermined speed has been reached and then to open said switch.

4. In combination, a split phase motor having main and start windings, a switch associated with the start winding for modifying its circuit between start and running conditions, said switch having an operating member biasing said switch to a closed position, a relay including a split phase motor structure having a pair of displaced windings connected to be energized by currents having the same phase displacement as the currents in the main and start windings of the motor and producing a split phase relay torque on the switch operating member in a direction to maintain said switch closed when the motor is being started, said torque diminishing as the motor increases in speed by reason of the change in phase displacement of the currents in the windings of the motor and relay, and additional means on the relay which respond to the current in the main winding of the motor for producing a torque opposed to the split phase relay torque for opening said switch at a desired speed less than full operating speed.

5. In combination, a split phase motor having main and start windings, circuits for connecting said windings in parallel circuits to a source of supply for starting purposes, a switch in the starting winding circuit for deenergizing said circuit as the motor comes up to speed, a split phase motor relay connected to have a controlling action on the operation of said switch, said relay having a pair of displaced windings connected in the main and start winding circuits of the motor for producing a split phase relay torque in a direction to maintain said switch closed when the motor is initially started, said torque diminishing as the motor comes up to speed by reason of the change in phase relation of the currents in its displaced windings and means for causing the opening of said switch when the split phase relay torque has diminished to a predetermined value.

6. In combination, a split phase motor having main and start windings, means for connecting said windings in parallel circuits to a source of supply for starting purposes, a switch spring biased to an open position in the starting winding circuit of said motor, a split phase motor relay having displaced windings connected in the main and start winding circuits of the motor respectively, said relay having a connection to the switch such that when both windings of the relay are energized by the initial starting currents in the main and start windings of the motor, the split phase relay torque holds said switch closed, said relay having a squirrel cage rotor provided with salient poles positioned with respect to the winding of the relay which is in the main winding circuit of the motor as to produce a reluctance relay torque in a direction to close said switch and which reluctance torque is substantially independent of the current in the starting winding circuit winding of the relay, said reluctance torque being greater than the spring bias when the motor is initially energized and less than the spring bias when the motor has accelerated to starting winding cut-out speed by reason of the corresponding decrease of the current in the main winding circuit.

7. In combination, a split phase motor having main and start windings, circuits for connecting said windigs in parallel to a source of supply for starting purposes, a switch spring biased to a closed position for modifying the starting winding circuit connections as the motor comes up to speed, a split phase motor relay having displaced windings connected in the main and start winding circuits of the motor, said relay having a connection to said switch and a split phase torque in a direction to maintain said switch closed when the motor is being started, which torque diminishes as the motor comes up to speed by reason of the change in phase relation of the currents in the main and start windings, said relay also being provided with shaded pole means energized by the current in the main winding circuit for producing a relay torque in a direction to open said switch, said torques being so related to each other and to the spring bias of said switch that the latter is opened to modify the starting winding circuit connections at a desired speed less than the full operating speed of the motor.

8. In combination, a split phase motor having main and start windings, connections for energizing said windings in parallel for starting purposes, a normally closed switch in the starting winding circuit for modifying the same between starting and running conditions, a split phase motor relay operatively connected to said switch, said relay having displaced windings connected in series with the main and start windings of the motor and producing a split phase torque, when said windings are first energized to start the motor, in a direction to hold said switch closed, which torque diminishes with rise in speed of the motor due to change in phase relation of the currents in the displaced windings, and a thermal device heated in response to the main winding current for opening said switch when the motor has started and the split phase relay torque has decreased to approximately a predetermined value.

9. In combination, a split phase capacitor-start, capacitor-run motor having main and start windings, circuits for energizing said windings in parallel, capacity included in the starting winding circuit, a switch and connections for reducing the capacity in the starting winding circuit between starting and running conditions, a split phase motor relay operatively connected to said switch, said relay having displaced windings connected to be respectively energized in phase with and in proportion to the currents in the main and start windings of the motor when said switch is in motor starting position for producing a torque in a direction to hold said switch in starting position when said motor windings are first energized to start the motor, which torque decreases as the motor comes up to speed by reason of the change in the phase relation of the currents in its displaced windings, and means for moving said switch to running position when said split phase relay torque has decreased to approximately a predetermined value, said switch, when so moved, also deenergizing one of the windings of said relay.

EDWARD J. SCHAEFER.